Nov. 29, 1966   D. A. BEHRICK   3,288,513
GAFF HOOK

Filed Nov. 23, 1964   2 Sheets-Sheet 1

INVENTOR.
DAVID ATWOOD BEHRICK
BY Lothrop & West
Attorneys

Nov. 29, 1966  D. A. BEHRICK  3,288,513
GAFF HOOK
Filed Nov. 23, 1964  2 Sheets-Sheet 2
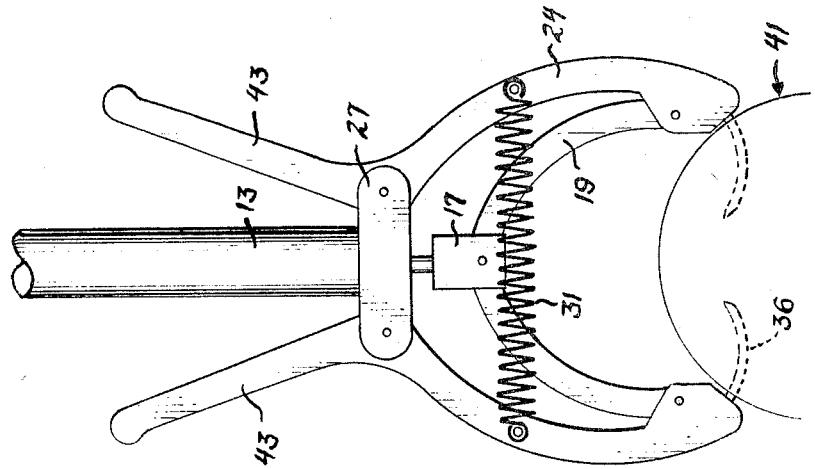
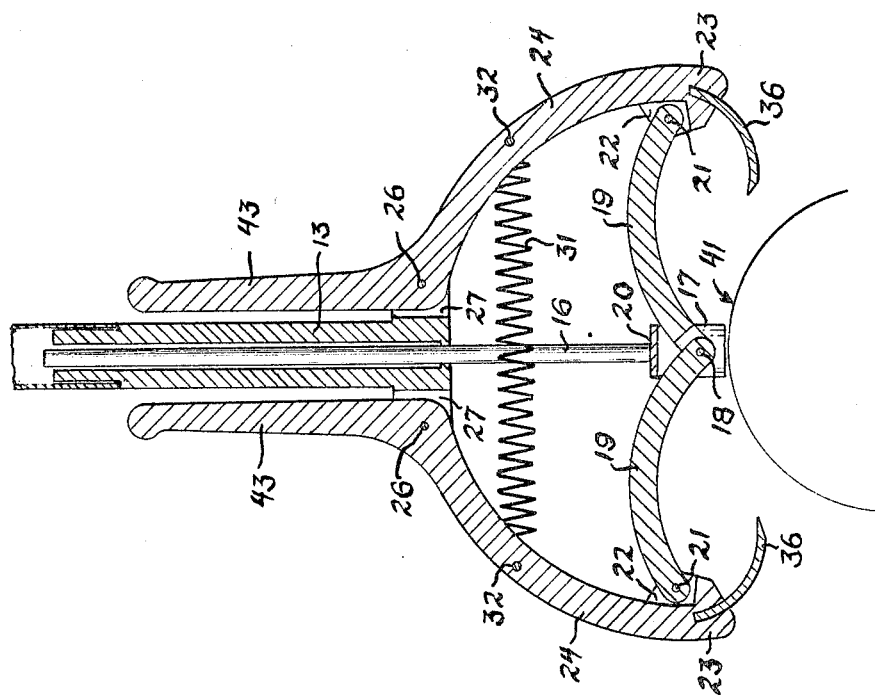
INVENTOR.
DAVID ATWOOD BEHRICK
BY Lothrop & West
Attorneys 3,288,513
GAFF HOOK
David Atwood Behrick, 948 Alder St., Chico, Calif.
Filed Nov. 23, 1964, Ser. No. 413,088
2 Claims. (Cl. 294—19)

The invention relates to equipment for catching and retrieving fish, frogs and other similar wild-life.

Heretofore, large fish which have been caught on a line and played so as to be brought close to the fisherman have been hooked by a gaff, usually wielded by another person, to prevent loss of the fish at the last crucial moment when the fish gives a final effort to escape.

The gaffs used in the past have customarily comprised a long handle with a curved hook mounted on the end of the handle. In the hands of a skilled person, the gaff hook is adroitly maneuvered so that the hook can be inserted under one of the gill covers and the fish readily removed from the water. Too frequently, however, the customary gaff hook is not handled properly, with the result that despite repeated attempts, the fish is not retrieved, but instead the fish breaks loose and escapes, but is so bruised by the thrusts of the hook that it dies within a short time, thus constituting a waste of wild life.

It is therefore an object of the invention to provide a gaff hook which is effective to retrieve a fish even when the device is wielded by a relatively unskilled person.

It is another object of the invention to provide a gaff hook which is effective at first contact to retrieve a fish and which, therefore, avoids the waste of fish heretofore caused by bruising but without capture.

It is a further object of the invention to provide a hook which is capable not only of gaffing fish but also frogs and other game as authorized by law.

It is still a further object of the invention to provide a generally improved gaff hook.

Other objects, together with the foregoing, are attained in the embodiment described in the following description and shown in the accompanying drawing in which.

Figure 1:
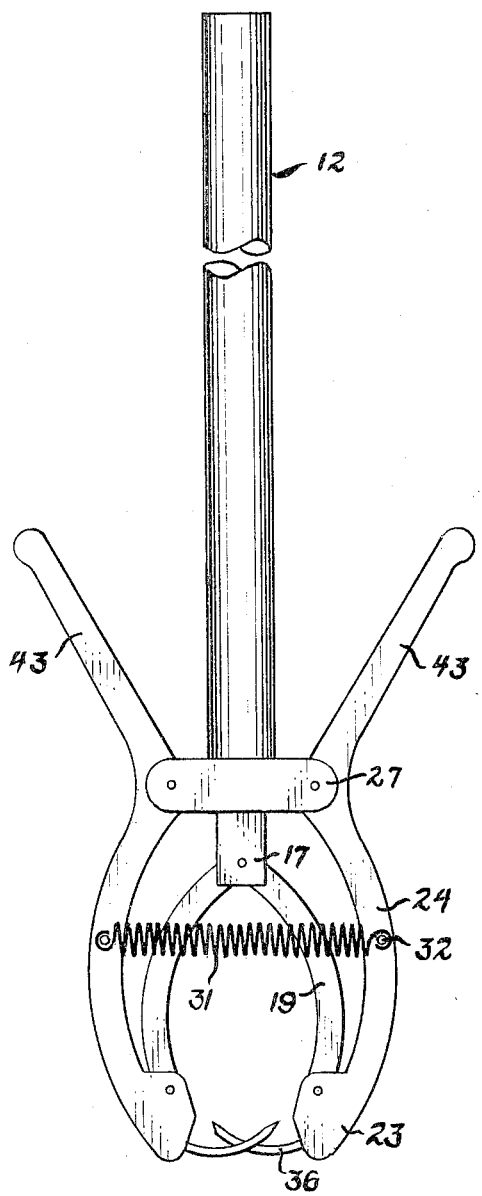
FIG. 1 is a front elevational view, a portion of the shaft being broken away to reduce the extent of the figure.

FIG. 3 is vertical, median sectional view of the FIG. 1 device but with the jaws in extended or open condition, and with the trigger portion shown just prior to contact with a fish or other object to be impaled, the object being shown in fragmentary and stylized fashion; and, FIG. 4 is a front elevational view, showing the attitude of the parts with the hooks impaling the fish or other object being gaffed.

While the gaff hook of the invention is susceptible of numerous physical embodiments, depending upon the environment and requirements of use, substantial numbers of the herein shown and described embodiment have been made, tested and used, and all have performed in an eminently satisfactory manner.

Conveniently, the gaff hook of the invention is mounted on the end of a shaft 12, such as aluminum tubing.

Figure 2:
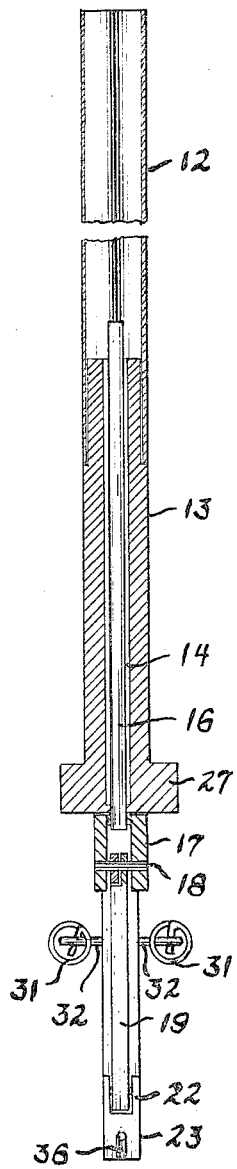
FIG. 2 is a transverse, vertical, median, sectional view of the FIG. 1 device.

Appropriately secured to the lower end of the tubing 12 is a circular cylindrical member 13 having formed therein an axial bore 14 within which is translatably disposed a plunger 16 adapted to move between the retracted location shown in FIG. 2 and the projected or cocked position illustrated in FIG. 3.

Mounted on the distal, or lower, end of the plunger 16 is a clevis 17 serving as a trigger mechanism. A pin 18 spanning the clevis has pivotally mounted thereon a pair of laterally extending levers 19, the clevis or trigger, also including a top plate 20, or limit stop, which interferes with the levers 19 in fully open position, as in FIG. 3.

The distal or outer ends of the levers 19 are pivotally mounted on pins 21 located in brackets 22 formed on the lower ends 23 of a pair of clamping jaws 24.

The jaws 24 are themselves pivotally mounted on pins 26 disposed within flanges 27 laterally projecting from the lower end of the cylinder 13.

A pair of strong helical tension springs 31 is suitably mounted, as on pins 32 secured to the jaws 24, the springs being effective to bias the jaws from the open position shown in FIG. 3 toward the closed position shown in FIG. 1.

Mounted on the lower ends 23 of the jaws 24 is a pair of hooks 36 projecting inwardly toward each other and serving to impale a fish or other object, such as a frog. The object is shown fragmentarily and in idealized form in FIGS. 3 and 4 and is generally designated by the reference numeral 41.

The jaws 24 are moved from the closed position shown in FIG. 1 to the open and cocked condition illustrated in FIG. 3 by pressing inwardly, toward the shaft, on a pair of hand grips 43. As appears most clearly in FIG. 3, the hand grips 43 are extensions of the jaws 24 upwardly beyond the fulcrum provided by the pins 26, and thus the hand grips form, with the jaws, a bell-crank type of mechanism.

The jaws 24, having been opened by pressing inwardly on the hand grips 43 against the bias of the tension springs 31, are cocked or sensitively retained in open position, by reason of an over-center locking mechanism. The over-center latching arrangement includes the plunger 16, the trigger 17, the levers 19, the jaws 24 and the springs 31. The dimensions of the elements and the placement of the various fulcrum pins are such (as appears most clearly in FIG. 3) that in the cocked position shown, the force of the springs 31 exerted on the jaws 24 and the levers 19 urges the trigger 17 and the plunger 16 downwardly. Further downward movement of the trigger 17 is limited and stopped, however, by the interference between the levers 19 and the cross-plate 20 at the top of the clevis-shaped trigger 17, as previously explained.

Again, with reference to FIG. 3 it can be seen that by pushing downwardly on the shaft so that the bottom of the trigger 17 forcefully touches the subjacent object 41, the trigger 17 and the adjacent ends of the levers 19 are urged upwardly. As soon as the fulcrum pin 18 passes upwardly beyond the center, i.e., beyond the imaginary line connecting the fulcrum pins 21, the entire force of the springs 31 is brought instantly to bear in clamping the jaws 24 together, this movement being attended by a swinging of the inner ends of the levers 19 into the upper, out-of-the-way, position shown in FIG. 4.

As the jaws are snapped toward each other, the hooks 36 pierce and deeply impale the interposed object 41, thus readily enabling the user to retrieve the object with a high degree of security.

After the object is safely retrieved, the user, by pressing inwardly on the hand grips 43, can quickly withdraw the hooks. Then, by further pressing the hand grips inwardly with a somewhat sudden press can cause the plunger 16 to eject with sufficient inertia so that the trigger 17 and the inner ends of the levers are "popped" into over-center location (see FIG. 3) and the mechanism is thus again placed into cocked or ready position.

It can therefore be seen that I have provided a compact yet convenient and highly reliable gaff hook device.

What is claimed is:
1. A gaff hook comprising:
(a) an elongated shaft;
(b) a cylinder mounted coaxially on one end of said shaft, said cylinder having an axial bore therethrough;
(c) a plunger slidably disposed within said bore;
(d) a pair of jaws pivotally mounted on said cylinder adjacent the end thereof, said jaws including a pair of hand grips capable of biasing said jaws toward an open position as said grips are moved toward each other;
(e) spring means for biasing said jaws toward a closed position; and,
(f) a pair of levers pivotally mounted at one end adjacent the ends of said jaws and at the other end on the distal end of said plunger, said levers being disposed in an over-center locking attitude in fully projected position of said plunger, said levers biasing said plunger toward retracted position within said bore as said distal end of said plunger is moved beyond center position in a direction toward said cylinder.

2. The device of claim 1 further characterized by a pair of teeth mounted in said jaws to swing toward each other as said jaws are biased toward each other by said spring means.

References Cited by the Examiner

UNITED STATES PATENTS

| 1,206,733 | 11/1916 | Sirard | 294—110 |
| 2,533,230 | 12/1950 | Dixon | 294—110 X |

GERALD M. FORLENZA, *Primary Examiner.*

G. F. ABRAHAM, *Assistant Examiner.*